Nov. 4, 1969    F. E. DORSEY    3,476,543
LEHR FOR HEAT TREATING GLASS
Filed May 16, 1966    5 Sheets-Sheet 1
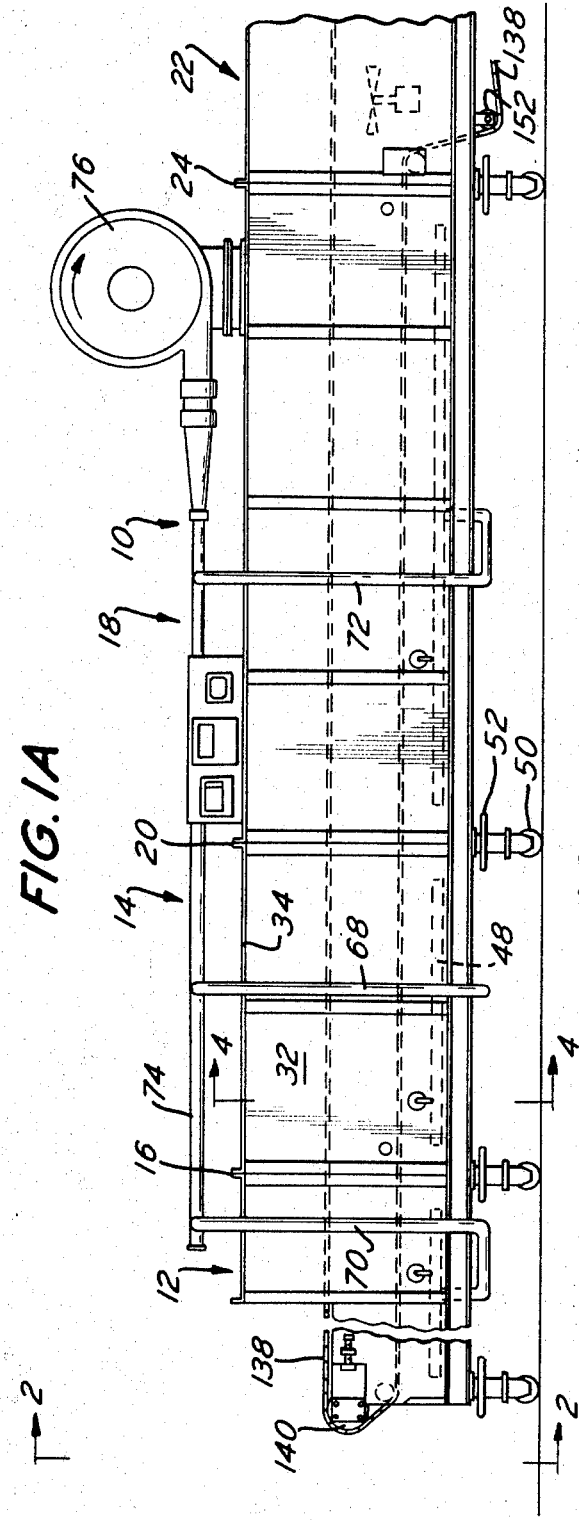
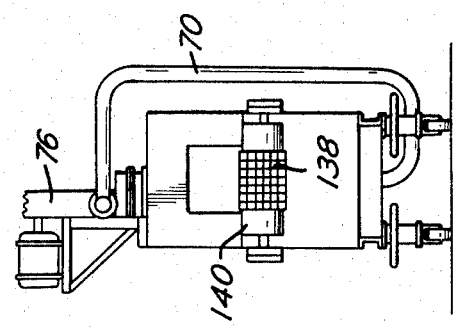
INVENTOR
FRANCIS E. DORSEY
BY Seidel & Gonda
ATTORNEYS.

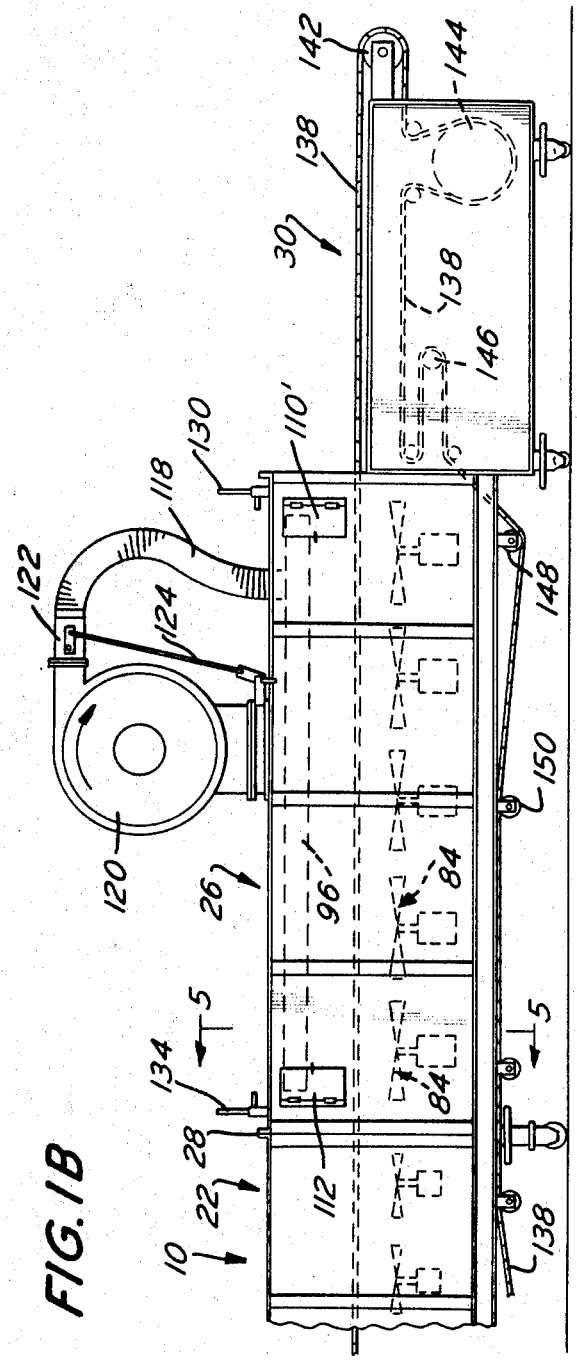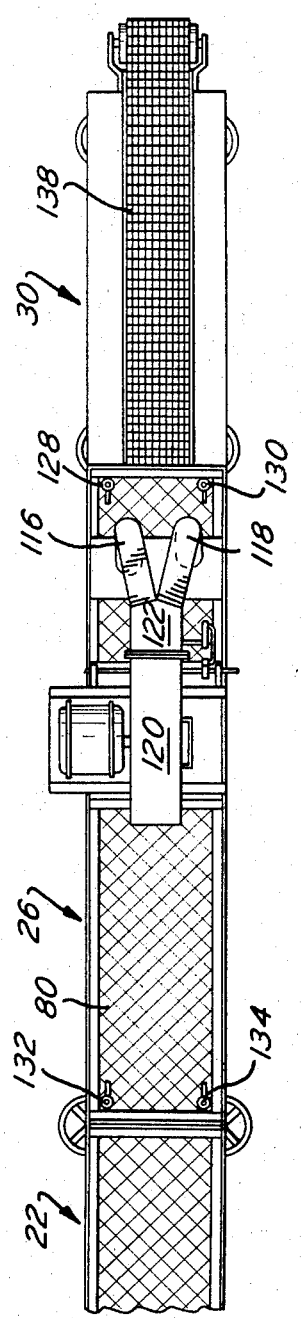

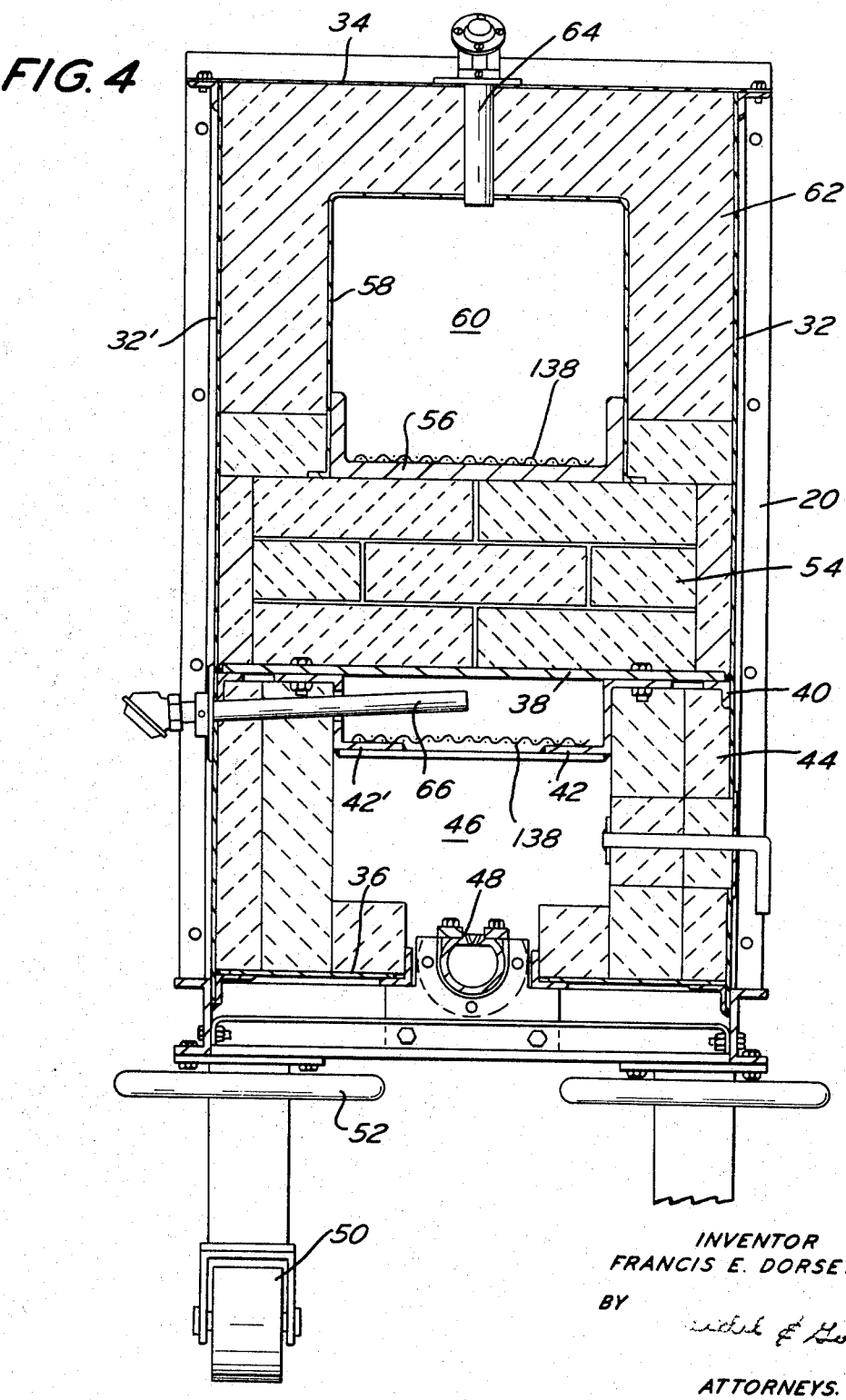

Nov. 4, 1969    F. E. DORSEY    3,476,543
LEHR FOR HEAT TREATING GLASS
Filed May 16, 1966    5 Sheets-Sheet 5
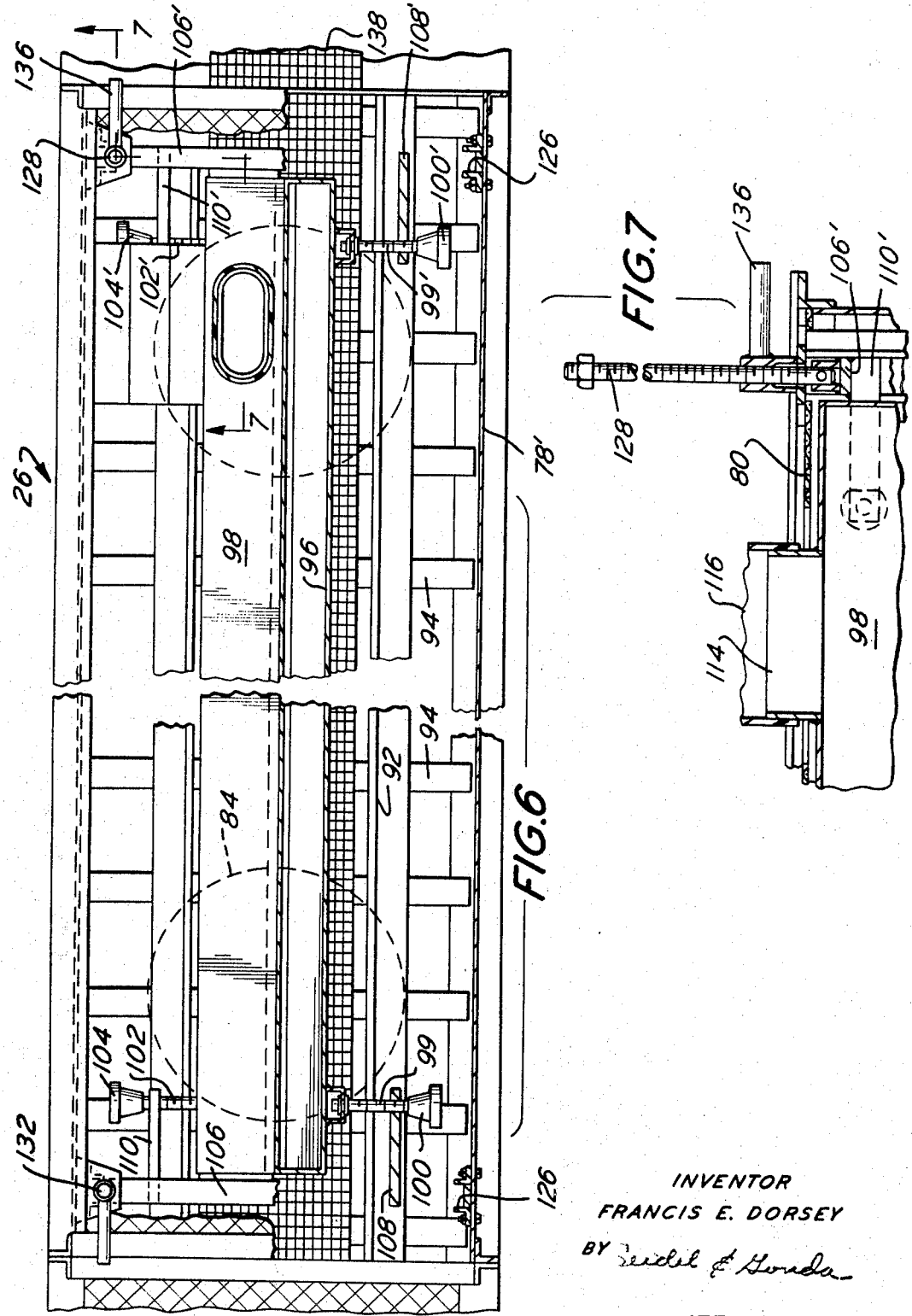
INVENTOR
FRANCIS E. DORSEY
BY
ATTORNEYS.

United States Patent Office 3,476,543
Patented Nov. 4, 1969

3,476,543
LEHR FOR HEAT TREATING GLASS
Francis E. Dorsey, Millville, N.J., assignor to Maul Bros. Inc., Millville, N.J., a corporation of New Jersey
Filed May 16, 1966, Ser. No. 550,470
Int. Cl. C03b 27/00
U.S. Cl. 65—349
10 Claims

ABSTRACT OF THE DISCLOSURE

A lehr for heat treating glass bottles is disclosed. Heat for annealing glass bottles is introduced only into the lower run of a conveyor endless belt. In a cooling section of the lehr, adjustable manifolds are provided for discharging air downwardly toward the bottles and fans are disposed below the bottles for blowing air upwardly toward the manifold.

This invention relates to a lehr, and more particularly, to an inline lehr for receiving and treating articles such as glass bottles immediately after manufacture of the glass bottles.

The lehr of the present invention is adapted to be in line with the conveyor on which newly manufactured glassware is received. Such a conveyor is shown, for example, in U.S. Patent No. 2,556,469. The present lehr includes an annealing section and a cooling section serially disposed. When glassware is received at the annealing section, it is at or above the annealing temperature. As the glassware passes through the annealing section, its temperature is equalized by radiation, convection and conduction to a temperature between the annealing temperature and strain point temperatures. The annealing temperature of glass has been defined as the temperature at which glass has a viscosity of $2.5 \times 10^{13}$ poises and has enough internal mobility to relieve itself of strains. The strain point temperature is the lower of the two. At the strain point temperature, the viscosity of glass is higher and the glass will only relieve itself of internal strains after long periods of time (up to fifteen hours).

The walls of the annealing section tunnel are at the equilibrium temperature and form a hot enclosure for the glassware traveling through the tunnel on a mesh type endless belt. This equilibrium temperature is controlled by the degree of heating of the conveyor belt. The heat mass, speed and temperature of the belt are the factors controlling the heat input to the tunnel. This aspect of the present invention is novel in the art of glassware lehrs.

During travel through the annealing section, the glassware is cooled by losing heat to the tunnel. The desired result is the completion of travel of the glassware through the annealing section when the glassware is at or below its strain point temperature. After the strain point temperature has been reached, rapid cooling commences in the cooling section. Such rapid cooling includes air blown upwardly from a series of fans in combination with air being directed downwardly through an elongated means including at least one manifold. Preferably there are two manifolds movable individually toward and away from each other while being movable simultaneously upwards and downwards. The structural interrelationship of the cooling section is another novel feature of the present invention.

It is an object of the present invention to provide a novel glassware lehr.

It is another object of the present invention to provide an inline glassware lehr which is simple, economical, and reliable.

It is another object of the present invention to provide a glassware lehr wherein the factors controlling heat put into the tunnel include the heat mass of an endless belt, the speed and temperature of the belt.

It is another object of the present invention to provide a lehr wherein an endless belt has upper and lower runs disposed within the annealing section so that heat may be introduced directly to the lower run for conduction to glassware or other objects on the upper run.

It is another object of the present invention to provide a lehr having a cooling section which includes at least one cooling manifold adjustably mounted for up-and-down movement.

Other objects will appear hereinafter.

For the purpose of illustrating the invention, there is shown in the drawings a form which is presently preferred; it being understood, however, that this invention is not limited to the precise arrangements and instrumentalities shown.

FIGURES 1A and 1B illustrate a side elevation view of the lehr of the present invention.

FIGURE 2 is a front elevation view taken along the line 2—2 in FIGURE 1A.

FIGURE 3 is a top plan view of that portion of the lehr illustrated in FIGURE 1B.

FIGURE 4 is a sectional view taken along the line 4—4 in FIGURE 1A.

FIGURE 6 is a sectional view taken along the line 6—6 in FIGURE 5.

FIGURE 7 is a sectional view taken along the line 7—7 in FIGURE 6.

Referring to the drawing in detail, wherein like numerals indicate like elements, there is shown in FIGURE 1 a lehr designated generally as 10.

Figure 5:
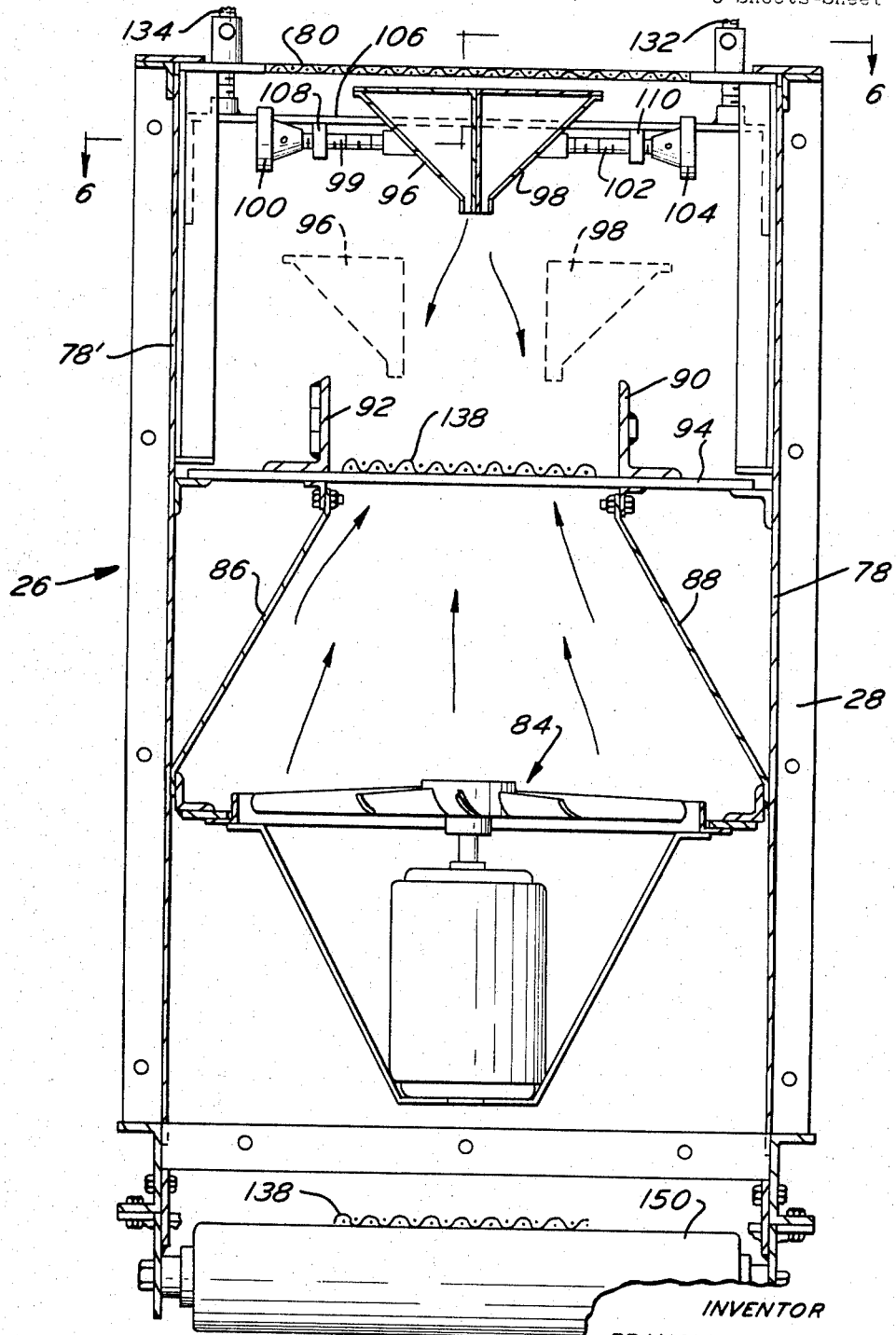
FIGURE 5 is a transverse sectional view taken along the line 5—5 in FIGURE 1B.

Referring to FIGURES 1A and 1B from left to right, the lehr 10 includes an initial inlet annealing section 12, annealing section 14 and an annealing section 18. These sections are in line with one another and are individual sections connected together. Thus, sections 12 and 14 are connected together at a flanged joint 16. Sections 14 and 18 are connected together at a flanged joint 20. By using individual modular sections, the length of the annealing portion of the lehr 10 may be adjusted to accommodate different sized glassware requiring a greater or shorter length of travel and heat input.

The cooling portion of the lehr 10 includes cooling sections 22 and 26. Cooling section 22 is connected to the annealing section 18 by means of a flanged joint 24. A flanged joint 28 interconnects the cooling sections 22 and 26. A discharge section 30 is in line with the outlet end of the cooling section 26.

Referring to FIGURE 4, it will be seen that the annealing section 14 includes a housing having side walls 32 and 32', a top wall 34 and a bottom wall 36. A central wall 38 is supported by brackets 40 from the side walls 32 and 32'. Belt support brackets 42 and 42' depend from and are supported by the central wall 38. Below the wall 38 and above the bottom wall 36, there is provided refractory blocks cooperating to define a belt heating chamber 46. A burner 48 is provided adjacent the bottom of chamber 46 and is supported by appropriate cross braces and framework.

The various sections are typically provided with movable support means. Such movable support means include upright legs terminating at the lower end with rollers 50. The height of the legs is manually adjustable by means of hand wheels 52. Thus, the entire lehr may be positioned wherever desired without any foundation work or other permanent structure which would materially add to the cost of installation of the equipment.

Refractory 54 is provided above the central wall 38. A plate 56 having upwardly extending guide ridges is provided. Therefore, plate 56 simulates a channel and is adapted to support an endless belt on which the articles to be treated will be moved through the lehr 10. A tunnel housing 58 is provided which cooperates with the plate 56 to define the tunnel 60. Appropriate heat insulation 62 surrounds the major portion of the tunnel housing 58. A thermocouple well 64 is supported by the top wall 34 so that the temperature within the tunnel 60 may be continuously monitored. A similar thermocouple weld 66 is provided for monitoring the temperature within chamber 60 adjacent the endless belt.

Referring to FIGURE 1A, there is provided a conduit 68 for delivering air to the burner 48. Similar conduits 70 and 72 are provided for delivering air to the burners of sections 12 and 18 respectively. These conduits communicate with a manifold conduit 74 connected to the outlet side of a blower 76. See FIGURES 1A, and 2, Separate conduits, not shown, supply gas to mix with the air for combustion in the burners.

Referring to FIGURE 5, the cooling section 26 includes a housing having side walls 78 and 78', a top wall which is open to the atmosphere. Thus, the cooling sections do not have a bottom wall. Fans 84 are supported within the section 26 adjacent the open bottom of the housing. Each fan 84 includes its own motor and is supported in a position so as to direct air upwardly through the deflector partitions 86 and 88 which converge towards each other. Partitions 86 and 88 are supported at their upper ends by a plurality of parallel struts 94. The ends of the struts are supported by brackets on the inner surface of the side walls 78 and 78'.

Channels 90 and 92 are supported on the upper surface of the struts 94 and in line with the upwardly extending legs of member 56. A pair of cooling manifolds 96 and 98 are adjustably supported above the struts 94. Manifolds 96 and 98 have a length which is slightly less than the length of section 26. As shown more clearly in FIGURE 5, the manifolds 96 and 98 are triangular in cross section with their discharge port adjacent the lower corner and with one side of the triangular manifolds being vertical. Said one side of the manifolds are in abutting contact with one another in the centralmost disposition of the manifolds as shown in solid lines in FIGURE 5.

The manifolds 96 and 98 are adapted to be moved toward and away from each other so as to adjust the vertical disposition of the downwardly directed cooling stream. The maximum horizontal adjustment of the manifolds 96 and 98 is illustrated in phantom in FIGURE 5 as well as the lowermost disposition of the discharge ports for the manifolds. The discharge ports for the manifolds extend for the full length of the manifolds.

Referring to FIGURES 5 and 6, it will be seen that one end of the threaded shaft 99 is rotatably connected to manifold 96. Shaft 99 is provided at its other end with a handle 100. Shaft 99 is threadedly coupled to a bushing bar 108 which in turn is connected to a strut 106. A similar shaft 102 is coupled to manifold 98 and provided with a handle 104. Shaft 102 is similarly threaded to a bushing bar 110 which in turn is supported from the strut 106. The other end of the manifolds 96 and 98 is similarly supported with corresponding primed numerals as shown at the righthand end of FIGURE 6.

The side walls of the housing of cooling section 26 are provided with doors 110' and 112 which facilitate access to the various handles 100, 104, 100', and 104', so that the manifolds 96 and 98 may be adjusted toward and away from each other.

Each of the manifolds is provided with an upwardly directed boss at the end thereof which is closest to the discharge section 30. As shown more clearly in FIGURE 7, manifold 98 is provided with an upwardly directed boss 114 connected to one end of a flexible hose 116. A similar hose 118 is connected to a similar boss on the manifold 96. The hoses 116 and 118 are connected through a valved control section 122 to a pump 120. An actuator 124 is provided for controlling flow through the section 122.

The manifolds 96 and 98 are adjustable as a unit up and down. To facilitate such up and down movement, channels 126 are provided for the ends of the struts 106 and 106'. One end of the shaft 128 is rotatably connected to one end of strut 106'. A similar shaft 130 is connected to the other end of strut 106' in a similar manner. Likewise, shafts 132 and 134 are rotatably connected to the ends of strut 106. Each of the threaded shafts 128–134 are provided with handles 136. Rotation of the handles causes the struts to move up and down in their guide channels. A nut is threaded to the upper end of the shafts to act as a limit stop.

An endless mesh type metal belt 138 is provided to support the articles to be treated during passage through the lehr 10. At the inlet end of the lehr 10, the annealing section 12 is provided with a rotatably supported roller 140 around which the belt 138 extends. During passage through the annealing sections 12, 14, and 16, the belt 138 is supported by the plate 56. During passage through the cooling sections, the belt 138 is supported by the struts 94. At the discharge section 30, the belt 138 extends around an idler roller 142. Within the discharge section 30, the belt 138 extends around a drive roller 144 connected to a motor, not shown. From roller 144, the belt 138 extends around idler rollers including a take-up roller 146 to facilitate taking up slack in the belt. Belt 138 is preferably made from a metal capable of acting as a heat sink such as steel.

From the discharge section 30, the belt 138 extends around and below idler roller 148 and then above idler rollers 150 around the bottom of idler roller 152 and then into the annealing portion of the lehr 10. When passing through the annealing portion of the lehr 10, the belt 138 is supported by the supports 42 and 42' above the burners so that the portion of the lower run of the belt 138 may be heated before it passes through the annealing tunnel The burners heat the portion of the lower run of the belt to a temperature slightly higher than the desired temperature to take into consideration heat losses outside the tunnel which losses are a function of belt speed and belt mass.

In operation, hollow glassware such as bottles are deposited by the glassware forming machine directly on belt 138 at the inlet of section 12 or transferred thereto from the forming machine conveyor. The glassware is conveyed through lehr 10 by belt 138 in a manner so that the glassware is in a single row or in two substantially parallel rows. In the annealing sections 12, 14 and 18, the temperature of the glassware is equalized and cooled to substantially the strain point temperature. The last-mentioned temperature is reached just before the glassware is conveyed into the cooling sections 22 and 24 wherein rapid cooling commences. Cooling in sections 22 and 24 includes subjecting the belt 138 and the glassware to forced cooling air from above and below. The cooling air from above, namely that discharged from manifolds 96 and 98, can enter into the hollow glassware. Therefore, it is desirable to adjust the position of the manifolds so that their discharge ports are aligned with the row or rows of glassware.

The operation of the lehr 10 should be readily apparent to those skilled in the art in view of the above description. Hence, a detailed description of the operation of lehr 10 is not deemed necessary.

I claim:

1. A lehr comprising a housing having an annealing section and a cooling section, a mesh type endless belt for moving articles through said sections, said annealing section having a belt heating chamber, said belt heating chamber being below the plane of the upper run of the belt and insulated therefrom with a portion of the return run of the belt passing through the belt heating chamber, and means for heating only said return run of the belt in said chamber so that the temperature thereof is at the desired temperature for controlling the equilibrium temperature of the walls of said annealing section.

2. A lehr in accordance with claim 1 wherein said cooling section includes at least one adjustable manifold therein for discharging air downwardly toward the plane of the belt adapted to support articles while they are moving through the cooling section, and fans below said belt upper run for blowing air upwardly through the belt toward the manifold.

3. A lehr in accordance with claim 2 including two such manifolds and means for moving said manifolds toward and away from each other.

4. A lehr in accordance with claim 2 including two such manifolds and means for moving said manifolds up and down.

5. A lehr in accordance with claim 1 wherein said means includes a burner for said annealing section, refractory in said annealing section between the runs of said belt and isolating the upper run of the belt from said belt heating chamber, said belt being the only means in the annealing section for heating articles to be annealed therein.

6. A lehr comprising a housing having an annealing section and a cooling section, an endless mesh type belt for conveying articles through said sections, said cooling section including at least one manifold therein above the belt, means supporting said manifold for up and down movement, said manifold having aperture means for discharging a cooling gas downwardly towards said belt.

7. A lehr in accordance with claim 6 including two such manifolds movable toward and away from each other, and a flexible conduit connected to each manifold for delivering cooling air thereto.

8. A lehr in accordance with claim 6 wherein said manifold has a discharge port extending for substantially its entire length.

9. A lehr in accordance with claim 6 including a burner in said annealing section, heat insulating refractory in said annealing section isolating portions of the runs of the belt, and means at the location of said refractory for heating only the isolated return run portion of the belt so that the temperature thereof is at the desired temperature for effecting annealing of the articles.

10. A lehr in accordance with claim 6 including a flat plate supporting said belt within the annealing section.

References Cited
UNITED STATES PATENTS

| | | | |
|---|---|---|---|
| 1,474,058 | 11/1923 | Stenhouse | 65—349 |
| 1,982,478 | 11/1934 | Morton et al. | 65—119 |
| 2,539,159 | 1/1951 | Peiler | 65—118 |

S. LEON BASHORE, Primary Examiner

S. R. FRIEDMAN, Assistant Examiner

U.S. Cl. X.R.

65—111, 114, 119, 356; 263—28, 44